United States Patent [19]

Ammann

[11] Patent Number: 5,742,387
[45] Date of Patent: Apr. 21, 1998

[54] LASER BEAM LEVELLING DEVICE AND PROCESS FOR OPERATING A LASER BEAM LEVELLING DEVICE AND ASSOCIATED CONTRIVANCE

[75] Inventor: Hans-Rudolf Ammann, Amriswil, Switzerland

[73] Assignee: Ammann Lasertechnik AG, Amriswil, Switzerland

[21] Appl. No.: 769,233

[22] Filed: Dec. 18, 1996

[30] Foreign Application Priority Data

Dec. 21, 1995 [CH] Switzerland ............... 03642/95

[51] Int. Cl.$^6$ .............................. G01C 9/02; G01B 11/26
[52] U.S. Cl. .............................. 356/247; 33/290; 33/291; 33/1 CC; 33/1 DD
[58] Field of Search .............. 356/247, 139.04–139.1, 356/140–142, 147, 250, 152, 172, 141, 4, 138, 149, 150, 248, 249, 5; 33/1 CC, 1 DD, 290, 247, 248, 252, 273, 295, 281, 282, 285, 286, 291, 292, DIG. 21; 250/203 R

[56] References Cited

U.S. PATENT DOCUMENTS

| | | | |
|---|---|---|---|
| 4,221,483 | 9/1980 | Rando | 356/250 |
| 4,263,973 | 4/1981 | Boulais et al. | 172/4 |
| 4,291,982 | 9/1981 | Chin | 356/249 |
| 4,441,812 | 4/1984 | Feist | 356/147 |
| 4,752,126 | 6/1988 | Fujii | 356/140 |
| 4,820,041 | 4/1989 | Davidson et al. | 356/1 |
| 4,830,489 | 5/1989 | Cain et al. | 356/73 |
| 4,988,192 | 1/1991 | Knittel | 356/138 |
| 5,331,395 | 7/1994 | Piske et al. | 356/138 |
| 5,361,217 | 11/1994 | Makimura et al. | 364/561 |
| 5,485,266 | 1/1996 | Hirano et al. | 356/249 |
| 5,533,268 | 7/1996 | Keightley | 33/290 |
| 5,551,159 | 9/1996 | Mooty | 33/228 |

*Primary Examiner*—Frank G. Font
*Assistant Examiner*—Michael P. Stafira
*Attorney, Agent, or Firm*—Bachman & LaPointe, P.C.

[57] ABSTRACT

The present invention relates to a laser beam levelling device which has a rotating frame which is rotatable round a vertical axis and an inclining arrangement which is pivotal round a horizontal axis. Means connected to a controller are also provided to enable the rotated and inclined position to be monitored. One inclining arrangement can be orientated and inclined by the controller such that the laser plane formed by a rotating laser beam is inclined in a specific direction by a specific angle. This inclination is an auxiliary inclination by means of which the laser plane is simultaneously inclined in a longitudinal and transverse gradient differing from this auxiliary direction of inclination in each case. The auxiliary direction and the auxiliary inclination are calculated automatically by the controller on the basis of the desired longitudinal and transverse gradient of the laser plane and are converted into corresponding control commands. The orientation of the inclining arrangement can be monitored by a contrivance owing to a second laser beam which displays a vertical and is emitted according to the orientation of the inclining arrangement.

21 Claims, 5 Drawing Sheets

FIG.7
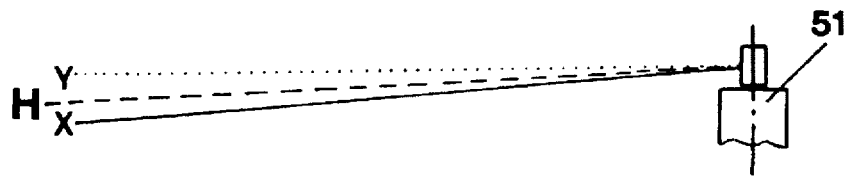
FIG.8
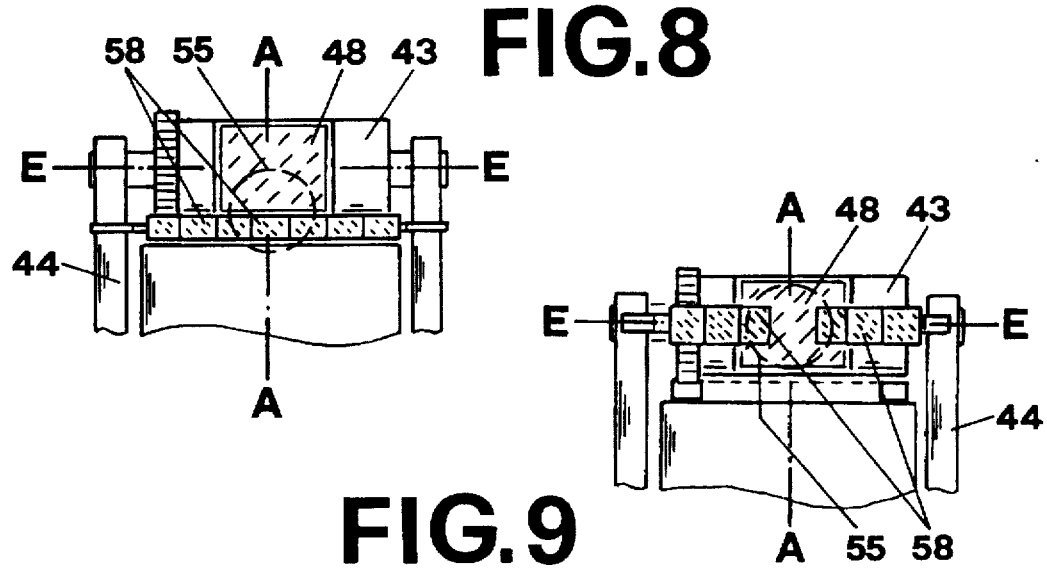
FIG.9
FIG.10
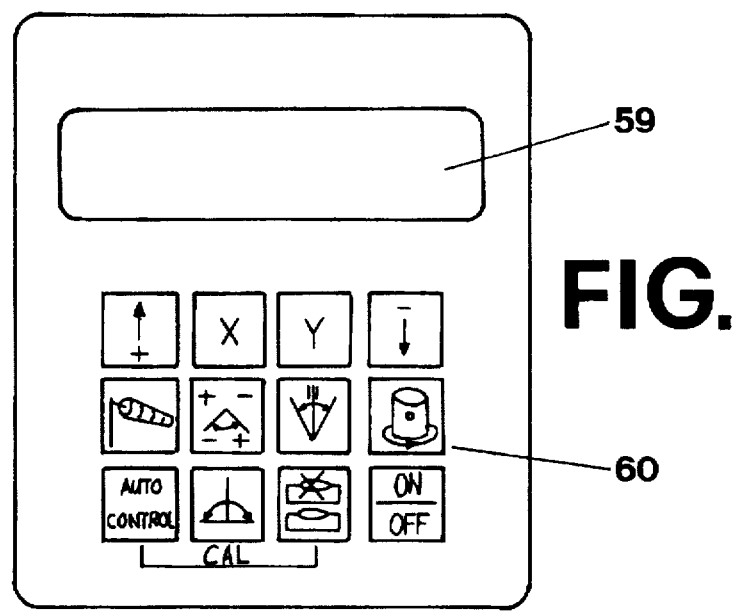

5,742,387

LASER BEAM LEVELLING DEVICE AND PROCESS FOR OPERATING A LASER BEAM LEVELLING DEVICE AND ASSOCIATED CONTRIVANCE

BACKGROUND OF THE INVENTION

The present invention relates to a laser beam levelling device with means for producing a laser beam and with a rotatable head which emits the laser beam, wherein the laser beam which can be set into rotation by the rotating head forms the horizontal or inclined laser plane which can be used for measurement purposes. The invention also relates to a process for operating a laser beam levelling device and to an associated contrivance.

Laser beam levelling devices of this type serve to establish a horizontal or inclined plane and are used for building purposes. The laser beam issuing from the device is set into horizontal rotation or into rotation inclined by a desired percentage, by a rotating head. The laser beam rotating similarly to a lighthouse light forms the laser plane. The laser beam can be received at any point round the levelling device by means of a receiver. The inclination of the imaginary plane between the levelling device and the receiver can therefore be measured. A laser beam levelling device of this type allows a plurality of measurement and monitoring tasks to be carried out. Laser beam levelling devices are used, for example, in the excavation and grading of ditches, in the control of concrete foundations and concrete ceilings, in the alignment of shuttering, in the levelling of tracks for overhead cranes and much more. For example, if a car park is to be brought to an inclination to allow drainage, control work can be carried out by means of the receiver fastened on a measuring rod or, preferably, grading work can be controlled by means of a receiver arranged directly on the grading machine.

Known laser beam levelling devices are usually equipped with a self-levelling means which sets the laser beam or the laser plane exactly into a horizontal position. Various apparatuses are also known for inclining the laser plane by a desired value. Considerable constructional problems arise if inclination is to be effected in both an X axis and a Y axis, i.e. in a longitudinal and a transverse gradient. For this reason, former levelling devices of this type are not satisfactory. Either a plurality of complicated components which have to be produced and assembled with high precision is required or operation of the levelling device has to be very complicated. In practice, this means that the levelling device is either very expensive or inaccurate in one case whereas frequent measurement errors are pre-programmed owing to complicated operation of the levelling device in another case.

SUMMARY OF THE INVENTION

It is accordingly an object of the invention to provide a laser beam levelling device of the generic type which, on the one hand, can be produced relatively simply and inexpensively and, on the other hand, functions very accurately but is still simple to operate in that it functions substantially automatically. A further object of the invention is to provide a process for operating a laser beam levelling device and an associated contrivance.

In accordance with one aspect of the present invention, there is provided a laser beam levelling device with means for producing a laser beam and with a rotatable head which emits the laser beam, wherein the laser beam, which can be set into rotation by the rotating head, forms a horizontal or inclined laser plane which can be used for measurement purposes and wherein said device further comprises a rotating frame which is pivotal or rotatable round a substantially vertical axis and at least one inclining arrangement which is connected to the rotating frame and is pivotal round a substantially horizontal axis, by means of which rotating frame and by means of which inclining arrangement the rotatable head can be pivoted or orientated both round the vertical axis and round the horizontal axis, an additional inherent rotating arrangement being provided for the rotatable head and the rotating frame as well as the inclining arrangement being provided with driving means and with means for determining the rotational or pivoted position, said driving means and said determining means being connected to at least one controller for determining the rotational or pivoted position, for monitoring and controlling the respective rotational or pivoted position.

Another aspect of the invention provides a process for operating a laser beam levelling device according to the invention, in which, for inclining a laser plane both in an X axis and in a Y axis, for example in the direction of a longitudinal gradient X and a transverse gradient Y at right angles thereto, the rotating frame is orientated by the controller in such a way toward an auxiliary axis H lying within the angle of 90° formed between the X axis and the Y axis that the pivot axis of the inclining arrangement lies at right angles to this auxiliary axis H so the inclining arrangement can be inclined in the direction of the auxiliary axis H; and the angle of inclination of the inclining arrangement in the direction of the auxiliary axis H is determined by the controller such that, by inclining the inclining arrangement and therefore the laser plane by a specific auxiliary angle of inclination toward the auxiliary axis H, the laser plane inevitably also inclined in the direction of the X axis and the Y axis owing to this inclining movement adopts the inclination desired for measurement purposes in these two axes X, Y, wherein a plurality of combinations of rotating frame rotational angles and inclining arrangement inclinations is programmed into the controller for these purposes so the device controller calculates an auxiliary axis H to be adopted by the rotating frame and an auxiliary angle of inclination to be adopted by the inclining arrangement on the basis of two angles of inclination in the X and Y axis to be input by an operator at an input arrangement and accordingly controls the driving means and the means for determining the rotational or pivoted position.

The invention also provides a contrivance for a laser beam levelling device according to the invention in which at least one reflector is provided with which a laser beam arriving from the laser beam levelling device at the contrivance can be reflected back to the laser beam levelling device.

BRIEF DESCRIPTION OF THE DRAWINGS

The invention will now be described in detail, by way of example, with reference to the drawings, in which:

FIG. 7 also shows the mode of operation of the levelling device according to the invention;

FIG. 8 shows a first variation of rotating head;

FIG. 9 shows a second variation of rotating head; and

FIG. 10 shows a display and control keyboard of a levelling device according to the present invention.

DETAILED DESCRIPTION OF PREFERRED EMBODIMENTS

All essential parts of the laser beam levelling device are arranged in a cylindrical housing 1 which can preferably be fastened on a tripod. At the top, a rotating head 3 emitting a laser beam 2 projects from the housing 1. The head 3 can also be protected by a hood 4 of any design which is merely indicated here. With the hood, it should be ensured that the outlet region for the laser beam is transparent. The upper lid part of the hood 4, on the other hand, can be closed and can also be provided with a carrying handle for the laser beam levelling device.

Figure 1:
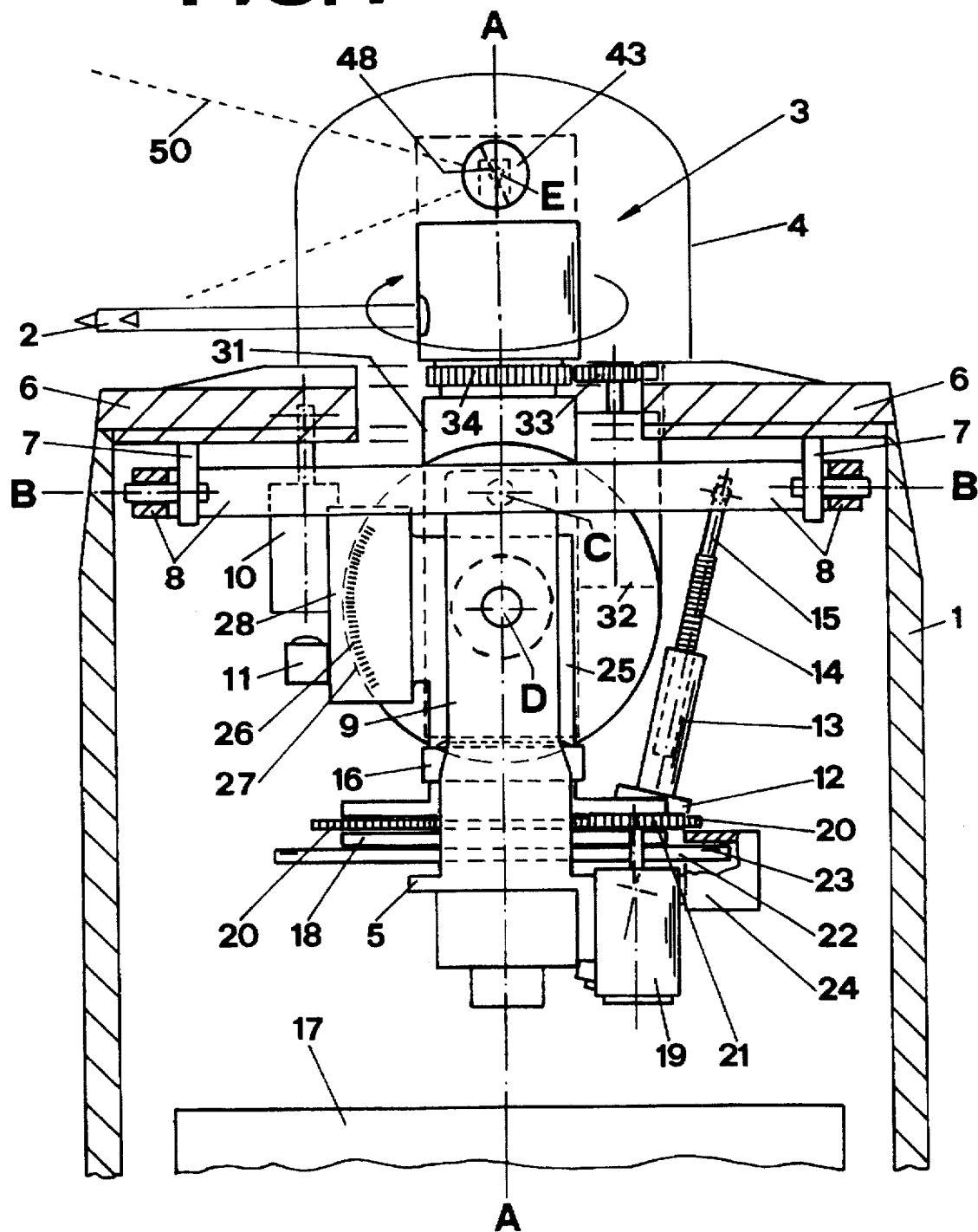
FIG. 1 is a vertical section through one embodiment of a laser beam levelling device according to the invention.
Figure 2:
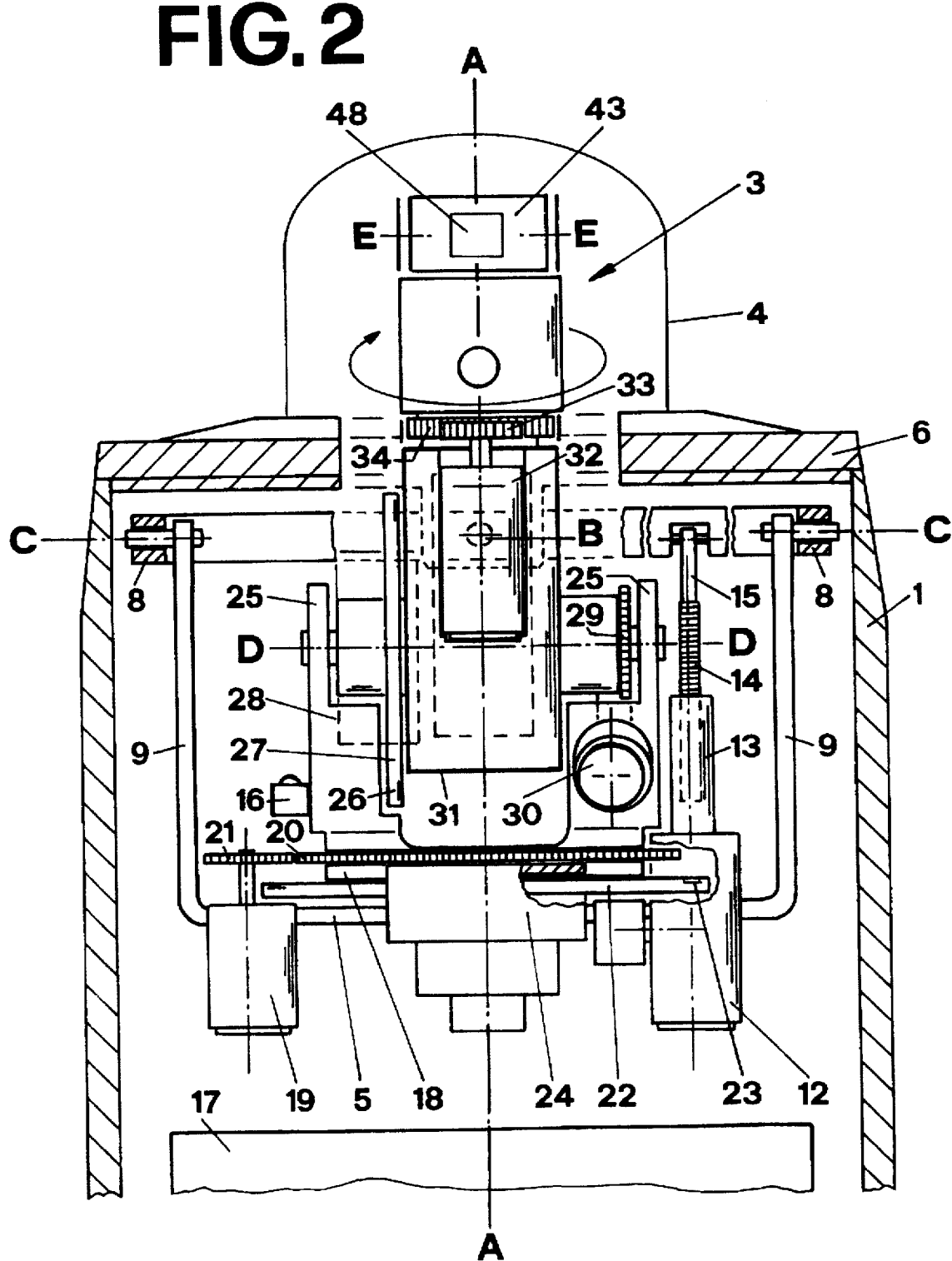
FIG. 2 is a vertical section taken on the line A—A in FIG. 1, i.e. through the levelling device turned through 90°.

According to FIGS. 1 and 2, self-levelling as well as the inclining of the laser plane formed by the laser beam 2 take place in the interior of the housing 1. For this purpose, a measuring plate 5 is initially mounted in a self-levelling manner on gimbals. All other components, i.e. the laser light optical system and the arrangements used for adjusting it are then arranged on the measuring plate 5.

Self-levelling takes place, for example, in the following manner. Gimbals 8 are articulated to two flanges 7 projecting downwardly from the housing lid 6 such that they are pivotal round an axis B—B. The measuring plate 5 is suspended from these gimbals 8. The measuring plate 5 is articulated to the gimbals 8 by means of carrier elements 9 fixed thereon such that it is pivotal round a second axis C—C extending at right angles to the first axis B—B. The measuring plate 5 and its two carrier elements 9 together substantially form a U, the upper ends of the two free U-webs, i.e. the carrier elements 9, being mounted on the gimbals 8 and the central U-web, i.e. the measuring plate 5, being suspended substantially horizontally. The gimbals 8 can be levelled by an electric motor 10 with which the distance between the freely pivotal region of the gimbals 8 and the housing lid 6 can be regulated, the electric motor 10 being connected to an electric spirit level 11. The exact design of this construction can be understood by reference to the corresponding, i.e. technically identically functioning, second construction of the measuring plate 5. An electric motor 12 is pivotally mounted on the measuring plate 5. On the drive shaft of the electric motor 12 there is fastened a threaded tube 13 in which there engages a thread 14 formed on a connecting element 15 articulated to the gimbals 8 by its upper end. The distance between this side of the measuring plate 5 and the gimbals 8 increases or diminishes due to rotation of the threaded tube 13 by means of the electric motor 12 so the measuring plate 5 is pivoted round the axis C—C and its angle to the gimbals 8 changes. This takes place until the attainment of the horizontal is announced by an electric spirit level 16.

The spirit levels 11 and 16 are arranged at right angles to one another in the illustrated starting position corresponding to the two pivot axes B—B and C—C. To ensure that levelling is as accurate as possible, the two levels 11 and 16 are arranged on the components 18 and 25 of the levelling device which are decisive for measurement and of which operation will be described hereinafter. However, it should be noted here that the component 18 is rotatable and carries the component 25. Therefore, the orientation of the two levels 11 and 16 changes in the course of measuring work with the levelling device. The device controller 17 can therefore advantageously be designed such that the two levels 11 and 16 are not rigidly allocated to a single pivot axis but are allocated either to one pivot axis B—B or to the other pivot axis C—C according to their position. For example, the controller 17 can be programmed such that the level 11 or 16 lying at an angle of less than 45° to the respective pivot axis B—B or C—C is used. This ensures that levelling can take place not only in the illustrated starting position but also in any orientation of the components 18 and 25 of the levelling device decisive for measurement. Levelling can therefore also be checked continuously during measurement work and negative effects of any vibrations of the levelling device can be compensated.

The two levels 11 and 16 also function in a known manner. They are each filled with a fluid which conducts electric current and each provided with electric contact points for the operation of two circuits. The current of the two circuits allows the corresponding electric motor 10 or 12 allocated to the respective level 11 or 16 to run forward or backward. These procedures are monitored by the device controller 17. If the measuring plate 5 is now levelled horizontally in every respect, the laser beam 2 leaving the rotating head 3 forms an exactly horizontal laser plane.

The parts which are decisive for the invention, i.e. the laser light optical system and the arrangements used for the adjustment thereof are arranged on the measuring plate 5. This region of the laser beam levelling device is designed as follows. A rotating frame 18 which is rotatable round the vertical axis A—A is arranged on the measuring plate 5, means for rotation being provided on the one hand and means for monitoring the rotational position of this rotating frame 18 on the other hand. Further details of these means will be given hereinafter. It should firstly be noted that an arrangement for inclining the unit comprising optical system and rotating head round a horizontal axis D—D is provided on the rotating frame so the laser plane formed by the rotating laser beam 2 can ultimately be inclined. Therefore, an inclination can be adjusted on the one hand and the direction of this inclination can be determined by rotating the rotating frame 18 on the other hand.

The rotating frame 18 can be rotated by an electric motor 19. For this purpose, the rotating frame 18 is rotationally engaged with a gear ring 20 which also rotates round the axis A—A and in which a gear wheel 21 arranged on the drive shaft of the electric motor 19 engages. The rotational position of the rotating frame 18 is determined by a measuring disk 22 which is connected to the rotating frame 18 similarly to the gear ring 20. A plurality of marks 23 is arranged on the measuring disk 22 in the edge region of the disk. This plurality of marks 23 is arranged in a circle corresponding to the circumference of the disk. The marks 23 are each individually identified so the respective rotational position of the measuring disk 22 and therefore of the rotating frame 18 can be determined from the read marks 23 using a rigidly arranged mark reading device 24. The mark reading device 24 as well as the electric motor 19 are connected to the device controller 17 which, in turn, is connected in the conventional manner to a control keyboard arranged externally on the laser beam levelling device. This enables a desired rotational position to be input, the device controller 17 controlling the electric motor 19 until the attainment of this rotational position is announced by the mark reading device 24.

A substantially U-shaped mounting 25 is arranged on the top of the rotating frame 18, the two free U-arms pointing upwardly and having bearings for receiving the horizontal axis of rotation D—D. The complete unit comprising optical system and rotating head is pivotal round this horizontal axis D—D. As with the rotating frame 18, a measuring disk 27 which has marks 26 and is allocated a mark reading device 28 is provided on the axis D—D. A gear ring 29 and an electric motor 30 are in turn also provided here so the rotational position can be determined and controlled, as already described hereinbefore.

The unit comprising optical system and rotating head is arranged in or on a pivoting housing 31 which is pivotal round the horizontal axis D—D, as mentioned. The rotating head 3 is mounted at the upper end of this pivoting housing 31. It is rotated by an electric motor 32 provided, on its drive shaft, with a gear wheel 33 which acts on a gear ring 34 rotationally engaged with the head 3.

Figure 3:
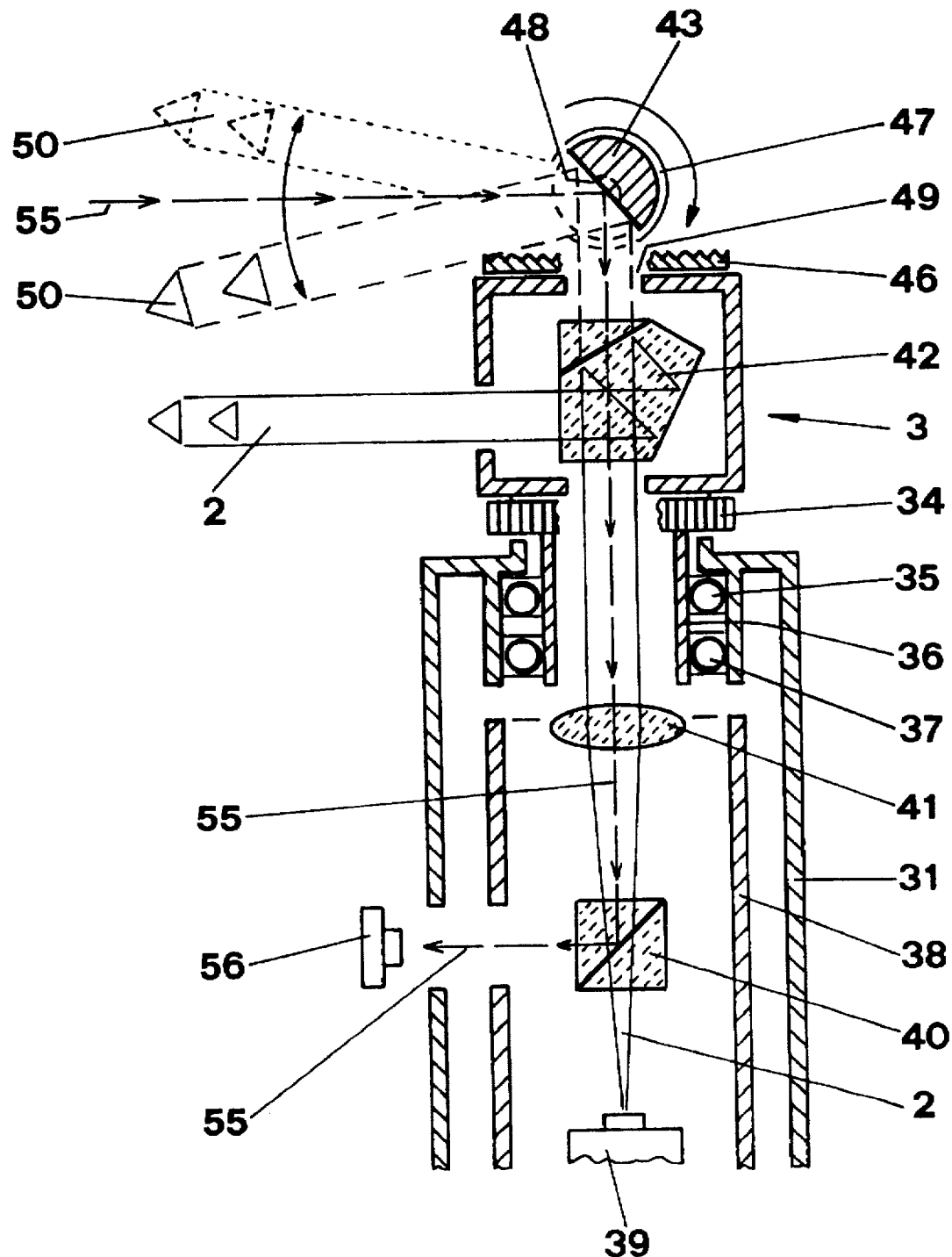
FIG. 3 is a schematic view of the optical parts of the levelling device shown in FIGS. 1 and 2.

For the sake of clarity, the design of the interior of the unit comprising optical system and rotating head is shown separately and schematically in FIG. 3. The head 3 is mounted by means of a ball bearing 35 in the region of a circular orifice at the upper end of the pivoting housing 31. For this purpose, the head 3 is provided at its lower end with a length of tube 36 on which the gear ring 34 is also arranged. A second ball bearing 37 provides stability. Separately from this, a tube housing 38 is fastened beneath the length of tube 36. The tube housing 38 is arranged non-rotatably in the pivoting housing 31 and therefore does not rotate with the head 3 or the length of tube 36. The laser light source 39, for example a laser diode, and a dice-shaped light splitter 40, of which the purpose will be described hereinafter, and an optical lens 41 are arranged rigidly in the tube housing 38. These parts are therefore arranged in an exchangeable part, the tube housing 38, for convenient servicing.

The laser beam 2 produced by the laser light source 39 is directed toward the head 3 vertically at the top and reaches it once it has been bundled by the lens 41. A pentagonal prism 42 which deflects the laser beam 2 into the horizontal is arranged in the head 3. The pentagonal prism 42 is arranged rigidly in the head 3 so it rotates therewith. As the laser beam 2 rotates similarly to a lighthouse light owing to the rotating head 3, as already mentioned, the laser plane which can be used for measurement purposes is formed.

Figure 4:
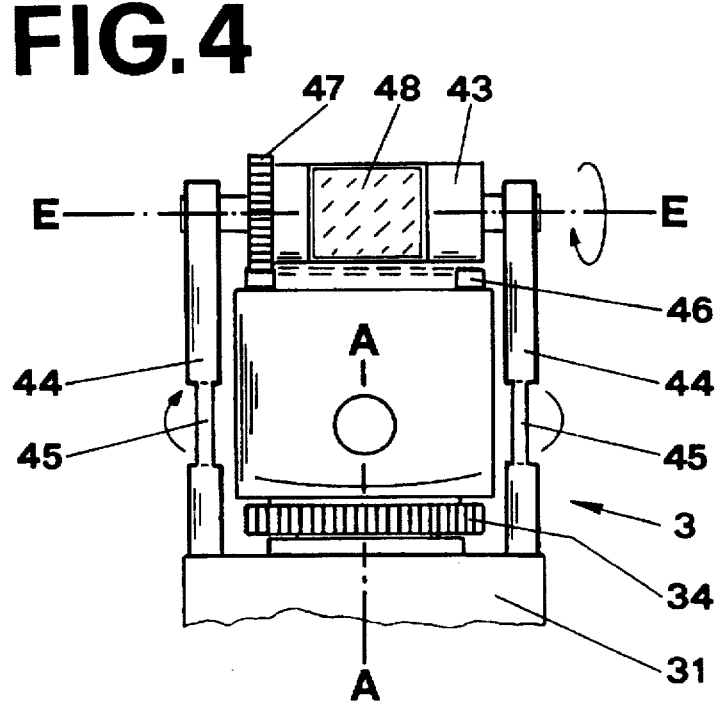
FIG. 4 is a view of the rotating head of the levelling device shown in FIGS. 1 and 2.
Figure 5:
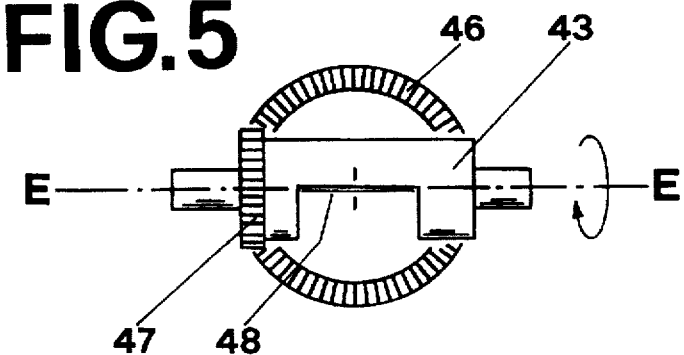
FIG. 5 is a partial plan view of the rotating head shown in FIG. 4.

This unit comprising optical system and rotating head also has some special features. In particular, a rotational element 43 mounted rotatably round a horizontal axis E—E is arranged above the head 3. The exact design can be seen in FIGS. 4 and 5. The rotational element 43 is mounted on supports 44 fastened on the pivoting housing 31. At the height 45 of the laser beam 2 leaving the head 3, the supports 44 are advantageously tapered in cross section in order, as far as possible, to avoid impairing the laser beam 2 repeatedly passing it during its rotation. No separate drive is provided for rotating the rotational element 43. Rather, the existing rotation of the head 3 is utilised and deflected. For this purpose, a gear ring 46 is arranged on the upper circular face of the cylindrical head 3. The gear ring 46 is allocated a gear wheel 47 which is rotationally engaged with the rotational element 43 and rotates round the axis E—E therewith. The rotation of the head 3 round the vertical axis A—A therefore automatically entrains the rotational element 43 round the horizontal axis E—E.

A mirror 48 is arranged on the rotational element 43. The rotational element 43 is provided with a recess for this purpose so the centre of the mirror surface is located substantially in the region of the axis of rotation E—E. The mirror 48 therefore rotates round the axis of rotation E—E.

The pentagonal prism 42 is designed as a pentagonal light-splitting prism. This means that a proportion of the laser beam 2 arriving vertically from below is not deflected into the horizontal but is allowed to pass straight on. The splitting of the laser beam 2 depends on the exact design of the pentagonal light-splitting prism 42. For example, 80% of the laser beam 2 could be deflected into the horizontal and 20% could be allowed to pass straight on. These 20% of the laser beam 2 leave the head 3 through an orifice 49 arranged in the cover of the head 3 exactly in the extension of the axis A—A and impinge on the mirror 48 rotating over this orifice 49. Whenever the mirror 48 is orientated in the course of its rotation to the laser beam 2 arriving from below, this laser beam 2 is detected and reflected by the mirror 48. As the mirror 48 continues rotating, the laser beam 2 is ultimately also deflected to the side so the laser beam 50 which is reflected by the mirror 48, is now the second and in leaving the head region of the levelling device is also visible and receivable to the side of the laser beam levelling device. Owing to the rotation of the mirror 48, however, this second laser beam 50 is not irradiated at a predetermined angle like the first laser beam 2 but, as indicated in FIG. 3, passes through a sector of a circle. In practice, this means that the second laser beam 50 becomes visible as soon as the mirror 48 has reached the necessary rotational position, then passes through a vertical track, i.e. describes a vertical path so to speak at its point of impingement and disappears again. This procedure is repeated with each rotation of the rotational element 43. The angle of the circular sector in which the second laser beam 50 is visible in each case is limited at the bottom by the head 3 and at the top by any protective hood or is produced by the restricted angular range in which the laser beam 2 arriving from below can be reflected. It is pointed out that the mirror 48 only rotates continuously round the horizontal axis A—A but does not perform the continuous rotation of the head 3 round the vertical axis A—A. Consequently, the point of impingement of the second laser beam 50 passing through a vertical path is determined by the rotational position of the rotating frame 18.

Figure 6:
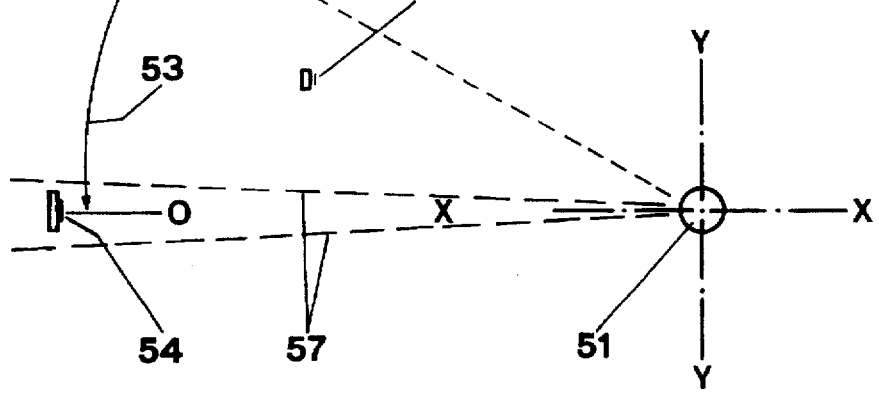
FIG. 6 shows the mode of operation of the levelling device according to the invention.

The mode of operation of this laser beam levelling device will now be described. According to FIG. 6, the laser beam levelling device 51, which is visible from above here, is erected in the region of a surface to be measured. The aim is to measure a longitudinal gradient X and a transverse gradient Y at right angles thereto. The laser beam irradiated by the laser beam levelling device is received, as known, by a receiver 52 which can be erected as desired 360° round the laser beam levelling device 51 or can also be arranged, for example, on a moving grading machine. This means that the receiver 52 corresponding to a target surface receives the laser beam emitted by the laser beam levelling device and rotating 360° round it when the receiver is held at the correct height. As the angle of inclination at which the laser beam 2 leaves the laser beam levelling device 51 is determined by the pivotal position of the pivoting housing 31, adjusted as desired, it is ensured that the surface to be measured has the desired inclination when the laser beam 2 is received by the receiver 52.

If the surface is to be measured not only in the direction of the longitudinal gradient X but also in the direction of the transverse gradient Y, a second inclining arrangement would be required. This is avoided in the present case in that determination of this second inclination, i.e. the transverse gradient Y, by computer is permitted owing to the exact establishment of the rotational position of the rotating frame 18 and therefore of the unit comprising optical system and rotating head, allowed in this laser beam levelling device. This means that, for fixing an inclination of the longitudinal gradient X and an inclination of the transverse gradient Y, the orientation of the rotating frame 18 and therefore of the unit comprising optical system and rotating head in a specific auxiliary axis H and the adjustment of a specific auxiliary inclination are necessary. Owing to the inclination of the unit comprising optical system and rotating head in the direction of the auxiliary axis H, the laser plane formed by the rotating laser beam 2 is also inevitably inclined in the region of the longitudinal gradient X and the transverse gradient Y as indicated in the diagram illustrated in FIG. 7. If exactly the same inclination is desired both for the longitudinal gradient X and for the transverse gradient Y, the auxiliary axis H will lie exactly in the centre between the two gradients X and Y, i.e. at an angle of exactly 45° to each of the two measurement axes X and Y. The more the inclinations of the longitudinal gradient X and the transverse gradient Y differ from one another, the closer the auxiliary axis H will shift to one or other gradient X and Y. The exact angle 53 of the orientation of the auxiliary axis H and its exact inclination change according to the desired combination of inclinations with respect to the longitudinal gradient X and the transverse gradient Y. The corresponding plurality of values is programmed in the device controller 17.

The exact orientation of the laser beam levelling device 51 or of its unit comprising optical system and rotating head ensure an exact measured result. The contrivance 54, among other things, also serves this purpose. According to the present example, orientation should take place exactly in the direction of the longitudinal gradient X. This orientation then serves as the 0-point for measuring the angle 53. The second laser beam 50 is used to enable this orientation to be carded out exactly. Owing to its particular movement, it describes a vertical line so to speak. If the laser beam 50 impinges on the contrivance 54, it is ensured that the laser beam levelling device 51 or its unit comprising optical system and rotating head is orientated correctly relative to the contrivance 54, i.e. in the desired axis. The contrivance 54 is then located exactly in the 0-point serving as a starting point for the angle 53.

Once the laser beam levelling device 51 has been orientated, the keyboard operator will merely type in the desired longitudinal gradient X and the desired transverse gradient Y. The device controller 17 will then control the electric motor 19 until the attainment of the rotational position of the rotating frame 18 required for the desired combination of inclinations is announced by the mark reading device 24. In a further stage, the device controller 17 will control the electric motor 31 until the attainment of the auxiliary angle of inclination required for the desired combination of inclinations is announced by the mark reading device 28. This complicated orientation and inclination of the laser plane therefore take place without further activity by the operator so errors are eliminated. The operator can see from a display associated with the keyboard whether he has typed in the correct values. This display or an illuminated light can indicate that the laser beam levelling device has performed the necessary adjustments and the laser plane is orientated as desired. However, it is also conceivable, for example, that the readiness of the laser beam levelling device for measurement is displayed by automatic connection and disconnection of the laser light source 39 in that connection initially takes place for orientation in the 0-axis and disconnection then takes place in the course of adjustment of inclination. If the laser light is then switched on, the operator knows that the laser beam levelling device is ready.

The equipping of the device with the measuring disks 22 and 27 provided with marks 23 and 24 and the associated mark reading devices 24 and 28 guarantees high-precision adjustment of the laser plane of the type required for such a precision levelling device.

The exact operation of the contrivance 54 will now be described. The contrivance 54 is provided with a reflector which reflects the laser beam 50 so the laser beam 50 is thrown back to the laser beam levelling device as laser beam reflected light 55. See also FIG. 3. This laser beam reflected light 55 is received by the mirror 48 in the region of the head 3 of the laser beam levelling device and is deflected downwardly, among other things. It passes to the aforementioned dice-shaped light splitter 40. The light splitter 40 is designed such that it allows the laser beam 2 coming from below to pass upwardly but deflects the laser beam reflected light 55 coming from above laterally toward a photocell 56. This is arranged externally on the pivoting housing 31 for practical reasons. Corresponding orifices are therefore provided in the wall of the pivoting housing 31 and of the tube housing 38 for laser beam reflected light 55. If the contrivance 54 and the laser beam levelling device 51 or its unit comprising optical system and rotating head are now correctly orientated relative to one another, the laser beam reflected light 55 is reflected and passes to the photocell 56. However, as the mirror 48 continuously rotates in the region of the head 3 of the laser beam levelling device, the laser beam reflected light 55 passes to the photocell 56 as pulsating light. The sensitivity of the photocell 56 is adjusted such that exactly this pulsating laser beam reflected light 55 is recorded and announced to the device controller 17. The device controller 17 therefore knows when the laser beam levelling device 51 and the contrivance 54 are orientated correctly relative to one another. The orientation of the laser beam levelling device 51 or of its module comprising optical system and rotating head can therefore be automated.

For this purpose, the device controller 17 should preferably be designed such that a search program can be called up. The rotating frame 18 is set into to-and-fro motion therein owing to the above-described means, so the second laser beam 50 leaving the laser beam levelling device, in particular, moves to and fro in an oscillating manner so to speak in the range of a sector of a circle 57 (FIG. 6) of 5°, for example. The up and down movement applied to this laser beam 50 anyway causes the laser beam 50 to perform search loops so to speak. If the laser beam 50 impinges on the contrivance 54 in the course of this search program, it is reflected by its reflectors, and this is immediately recorded by the device controller, as described hereinbefore. The device controller 17 stops the search program, i.e. the to-and-fro movement of the rotating frame 18, at this moment and sets the 0-point for measurement of the angle 53. These precautions not only ensure that errors in orientation of the laser beam levelling device can pass but also allow even a single operator to operate the device without difficulty. This is the case in particular, if the laser beam levelling device is provided with a remote controller. This single operator can therefore orientate the laser beam levelling device 51 roughly by eye, can then proceed to the point of the surface remote from the laser beam levelling device 51 with the contrivance 54 and can call up the search program by remote control. The laser beam levelling device 51 will have located the exact position of the contrivance 54 within a few moments. The desired inclination or combination of inclinations in the longitudinal and transverse gradients X and Y can now be input, also by remote control. FIGS. 8 and 9 now show two variations of the reception of the laser beam reflected light 55 which is reflected by the contrivance 54 and obviously impinges as a circular spot of light in the region of the rotational element 43. In contrast to the process described hereinbefore with reference to FIGS. 3 and 4, the laser beam reflected light 55 is recorded here in the immediate vicinity of the rotational element, preferably by a number of photocells 58 arranged next to one another.

According to the first variation shown in FIG. 8, the row of photocells 58 is fastened on the supports 44 such that it is located directly in front of the rotational element 43 but without rotating with it. The row of photocells 58 is located horizontally directly beneath the mirror 48 so the laser beam reflected light 55 impinges upon the photocells 58 when the desired orientation exists. As the row of photocells 58 is connected to the device controller 17, not only the impingement of the laser beam reflected light 55 but also its exact point of impingement can be detected thereby. Depending on whether the feedback from photocells 58 takes place from the left or right of the centre, it is recorded whether the laser beam reflected light impinges on the left or right.

The variation in FIG. 9 is very similar to that in FIG. 8. However, the row of photocells 58 is divided into two here and arranged at the height of the mirror 48 such that at least one photocell 58 is located to the right and at least one photocell 58 to the left of the mirror 48. The photocells 58 are also fastened stationarily on the supports 44 here. The mode of operation is the same as in the variation according to FIG. 8.

Owing to the arrangement of photocells 58 according to FIGS. 8 or 9, the design according to FIG. 3 is partially superfluous. In particular, the laser light splitter 40 which is accompanied by a certain loss of light can be dispensed with. Obviously, the photocell 56 associated with the light splitter is then no longer required. Finally, FIG. 10 shows how the display 59 and the control keyboard 60 of the laser beam levelling device, for example, could appear.

Owing to its particular design, the laser beam levelling device according to the invention not only functions with maximum precision but is also very simple to operate. The levelling system formed by the laser beam levelling device 51 and the associated contrivance 54 as well as one or more receivers 52 can also be managed by a single operator. Furthermore, owing to the irradiation of two laser beams 2 and 50 of which one displays a horizontal laser plane and the other a vertical, a floor and a wall can be measured simultaneously and can be orientated during construction, in particular in superstructures. Finally, the fact that the second laser beam 50 displaying the vertical position can be irradiated in an exactly measurable horizontal angle 53 affords the possibility not provided with conventional laser beam levelling devices of also measuring horizontal angles 53 exactly. This laser beam levelling device therefore has a number of decisive advantages over the state of the art.

What is claimed is:

1. A laser beam levelling device having means for producing a laser beam and a rotatable head arranged to emit the laser beam, wherein the laser beam, which can be set into rotation by the rotating head, forms a laser plane which can be used for measurement purposes and wherein said device further comprises a rotating frame which is rotatable about an essentially vertical axis and at least one inclining arrangement connected to the rotating frame and pivotal about an essentially horizontal axis, said rotatable head being pivotable about said essentially vertical axis in response to movement of said rotating frame about said axis and said rotatable head being further pivotable about said essentially horizontal axis in response to movement of said at least one inclining arrangement about said axis, and said device further comprising an additional rotating arrangement for rotating the rotatable head, driving means for driving the rotating frame and the at least one inclining arrangement, a first measuring arrangement for determining the rotational position of the rotating frame, a second measuring arrangement for determining the pivotal position of the at least one inclining arrangement, each said measuring arrangement having a plurality of successive marks thereon, a mark reading device for reading the marks on said measuring arrangements, at least one controller connected to said driving means and said mark reading device and arranged to control the positions of the rotating frame and the at least one inclining arrangement by activating the driving means depending on the positions of the marks on the measuring arrangements which are read by the mark reading device, and a further rotational element provided with at least one reflector and rotatable about an essentially horizontal axis.

2. A process for operating a laser beam levelling device having means for producing a laser beam, a rotatable head arrangement to emit the laser beam, a rotating frame, an inclining arrangement, driving means for driving the rotating frame and the inclining arrangement, a first measuring arrangement for determining the rotational position of the rotating frame, a second measuring arrangement for determining the position of the inclining arrangement and a controller connected to the driving means; in which, for inclining the laser plane in the direction of a longitudinal gradient in an X axis and in a transverse gradient in an axis Y at right angles to the X axis, the rotating frame is orientated by the controller in such a way toward an auxiliary axis H lying within the angle of 90° formed between the X axis and the Y axis that the pivot axis of the inclining arrangement lies at right angles to the auxiliary axis H so the inclining arrangement can be inclined in the direction of the auxiliary axis H; and the angle of inclination of the inclining arrangement in the direction of the auxiliary axis H is determined by the controller such that, by inclining the inclining arrangement and therefore the laser plane by a specific auxiliary angle of inclination toward the auxiliary axis H, the laser plane inevitably also inclined in the direction of the X axis and the Y axis owing to this inclining movement adopts the inclination desired for measurement purposes in these two axes X, Y, wherein a plurality of combinations of rotating frame rotational angles and inclining arrangement inclinations is programmed into the controller for these purposes so the controller calculates an auxiliary axis H to be adopted by the rotating frame and an auxiliary angle of inclination to be adopted by the inclining arrangement on the basis of two angles of inclination in the X and Y axes to be input by an operator at an input arrangement and accordingly controls the driving means and the means for determining the rotational or pivoted position.

3. A laser beam levelling device as claimed in claim 1, in which the rotating frame is mounted on a carrying structure provided with means for the self-levelling thereof, the inclining arrangement being arranged on the rotating frame.

4. A laser beam levelling device as claimed in claim 1, in which the rotating frame and the inclining arrangement each have an at least partially circular working face, which can be moved in each case by a means connected to the drive shaft of a respective electric motor.

5. A laser beam levelling device as claimed in claim 1, in which the plurality of successive marks is arranged in at least a partial circle on a measuring disk which is connected to one of the rotating frame and the inclining arrangement such that it rotates round the respective rotational or pivot axis and the mark reading device being arranged stationarily such that it does not rotate with the disk allocated to it.

6. A laser beam levelling device as claimed in claim 1, in which the inclining arrangement has a pivoting housing in or on which the laser light source is arranged, said pivoting housing having an upper end on which is mounted the rotatable head which can be driven by an electric motor also arranged on the pivoting housing, the pivoting housing being pivotally mounted round a horizontal axis on the rotating frame.

7. A laser beam levelling device as claimed in claim 1, in which in the rotatable head there is arranged a pentagonal prism in the form of a pentagonal light-splitting prism by means of which a proportion of the laser beam directed upwardly by a laser light source arranged beneath the head is deflected to the side, essentially at right angles, to form the laser plane while the remaining light of the laser beam from the pentagonal light-splitting prism is allowed through straight at the top, toward the reflector, of a rotational element rotatably mounted above it on a horizontal axis.

8. A laser beam levelling device as claimed in claim 7 in which the rotational element is mounted on at least one support which is not connected to the rotatable head and does not therefore perform its rotational movement, means being provided to enable the rotational element to rotate.

9. A laser beam levelling device as claimed in claim 8 in which a respective working face is provided both on the rotatable head and on the rotational element, which working faces cooperate with one another such that the rotational movement of the head taking place round an axis can be transmitted to the rotational element which is rotatable round a second axis essentially at right angles thereto so the rotational element does not require an additional electric motor.

10. A laser beam levelling device as claimed in claim 1, in which the reflector of the rotational element is arranged such that a reflective surface of said reflector rotates round the axis of rotation of the rotational element and detects and reflects a laser beam once during each revolution, the laser beam being deflected to the side by the rotational movement of the reflector and the laser beam passing through a vertical track in the form of a sector of a circle before the reflector again leaves the rotational range in which the laser beam can be detected, so a vertical line is drawn on a target surface through the passing spot of light formed by the laser beam.

11. A laser beam levelling device as claimed in claim 1, in which at least one light-sensitive arrangement is provided by means of which laser beam reflected light irradiated back from a contrivance provided with at least one reflector toward the laser beam levelling device can be received on the laser beam levelling device, said light-sensitive arrangement being connected to a controller.

12. A laser beam levelling device as claimed in claim 11, in which a light splitter is arranged on the axis between the laser light source and the reflector of the rotational element, said light splitter allowing the laser beam coming from the laser light source through at least in part in the direction of the reflector and deflecting the laser beam reflected light coming from the reflector at least in part toward said light-sensitive arrangement, a laser beam receiver being provided on which a further reflector is arranged and laser beam reflected light from said further reflector being detectable and being adapted to be announced to the controller, by means of the said light-sensitive arrangement.

13. A laser beam levelling device as claimed in claim 12, in which the light splitter is dice-shaped and has a light-splitting surface arranged essentially diagonally.

14. A laser beam levelling device as claimed in claim 11, in which the light-sensitive arrangement is arranged in the region of the rotational element.

15. A laser beam levelling device as claimed in claim 14, in which the light-sensitive arrangement is arranged in such a way with respect to the rotational element on the side turned toward the contrivance that the effect of its reflector is not impaired, the light-sensitive arrangement being arranged non-rotatably such that it cannot rotate either with the rotational element or with the head.

16. A laser beam levelling device as claimed in claim 14, in which the light-sensitive arrangement is divided in two and is arranged in such a way in the region of the side of the rotational element facing the contrivance that the two parts of the right-sensitive arrangement lie essentially at the height of the reflector and each lie on one of the two sides of the reflector, the light-sensitive arrangement being arranged non-rotatably such that it cannot rotate either with the rotational element or with the head.

17. A laser beam levelling device as claimed in claim 11, in which the light-sensitive arrangement consists of at least one photocell.

18. A laser beam levelling device as claimed in claim 1, in which the controller is designed and can be programmed such that, for inclining the laser plane both in an X axis and in a Y axis, i.e. in the direction of a longitudinal gradient X and a transverse gradient Y at right angles thereto, the rotating frame can be automatically orientated toward an auxiliary axis H located within the angle of 90° formed between the X axis and the Y axis such that the pivot axis of the inclining arrangement lies at right angles to this auxiliary axis H so the inclining arrangement can be inclined in the direction of the auxiliary axis H, the angle of inclination of the inclining arrangement in the direction of the auxiliary axis H being determinable by the device controller such that, by inclining the inclining arrangement and therefore the laser plane by a specific auxiliary angle of inclination toward the auxiliary axis H, the laser plane which is also inevitably inclined in the direction of the X axis and the Y axis owing to this inclining movement assumes the inclination in these two axes X, Y which is desired for measurement purposes and can be input by the respective operator on an input means connected to the device controller (17).

19. A laser beam levelling device as claimed in claim 3 in which the carrying structure is gimbal mounted for self-levelling thereof, a first element which is pivotal round a first axis and a second element which is pivotal round a second axis at right angles to the first being provided, each of said elements being connected to at least one electrical spirit level and to at least one electric motor by which the pivoted position of the respective elements round the respective axis can be controlled, so the two elements can be brought into the respective horizontal by the motor.

20. A process as claimed in claim 2 for operating a laser beam levelling device according to claim 12, in which the controller moves the rotating frame to and fro in a predetermined angle in the form of a sector of a circle when called upon.

21. A process as claimed in claim 20, in which the controller stops the to-and-fro movement of the rotating frame as soon as the laser beam reflected light irradiated back by a reflector arranged on a laser beam receiver is detected by the light-sensitive arrangement and is announced to the controller, this stop position serving as a 0-point for measurement of the angle in which the auxiliary axis H is to be orientated.

* * * * *